United States Patent [19]
Metzdorf et al.

[11] Patent Number: 5,992,815
[45] Date of Patent: Nov. 30, 1999

[54] HEIGHT-ADJUSTABLE COLUMN WITH A TRANSMITTING MECHANISM

[75] Inventors: Manfred Metzdorf, Koblenz; Axel Knopp, Eitelborn, both of Germany

[73] Assignee: Stabilus GmbH, Koblenz, Germany

[21] Appl. No.: 09/067,268

[22] Filed: Apr. 27, 1998

[30] Foreign Application Priority Data

Apr. 25, 1997 [DE] Germany ............................ 197 17 531

[51] Int. Cl.⁶ .................................................. F16M 13/00
[52] U.S. Cl. ........................ 248/631; 248/161; 248/162.1; 248/404; 248/405; 297/344.18; 297/34.19; 92/51; 92/53
[58] Field of Search ...................................... 248/161, 404, 248/157, 631, 405, 162.1; 297/344.19, 344.18; 92/51, 53, 136; 74/527, 531

[56] References Cited

U.S. PATENT DOCUMENTS

| | | | |
|---|---|---|---|
| 3,777,617 | 12/1973 | Okiyama | 297/344.19 |
| 4,592,590 | 6/1986 | Slaats et al. | 248/404 |
| 4,627,602 | 12/1986 | Sporck | 248/161 |
| 4,692,057 | 9/1987 | Lauderbach . | |
| 4,693,442 | 9/1987 | Sills | 248/157 |
| 4,720,068 | 1/1988 | Tornero | 248/161 |
| 4,756,496 | 7/1988 | Hosan et al. . | |
| 4,793,197 | 12/1988 | Petrovsky | 248/161 |
| 4,860,987 | 8/1989 | Werner | 297/344.18 |
| 5,377,942 | 1/1995 | Knopp et al. | 248/161 |
| 5,443,573 | 8/1995 | Thiele et al. | 248/161 |
| 5,531,413 | 7/1996 | Wolf et al. | 248/631 |
| 5,765,804 | 6/1998 | Stumpf et al. | 248/161 |

FOREIGN PATENT DOCUMENTS

| | | |
|---|---|---|
| 34 20 528 | 12/1985 | Germany . |
| 35 17 003 | 11/1986 | Germany . |
| 40 34 633 | 5/1992 | Germany . |
| 42 12 282 | 10/1993 | Germany . |

Primary Examiner—Leslie A. Braun
Assistant Examiner—Debbie Short
Attorney, Agent, or Firm—Baker & Botts, L.L.P.

[57] ABSTRACT

A height-adjustable column has a stationary tube that receives a height-changing mechanism, such as a pneumatic spring having a cylinder and a rod that are axially movable with respect to one another. A transmitting mechanism includes a movable member that is operatively associated with the rod and is movable in a direction opposite to the direction of movement of the cylinder upon extension of the pneumatic spring when the pneumatic spring is in a predetermined lift zone.

16 Claims, 4 Drawing Sheets

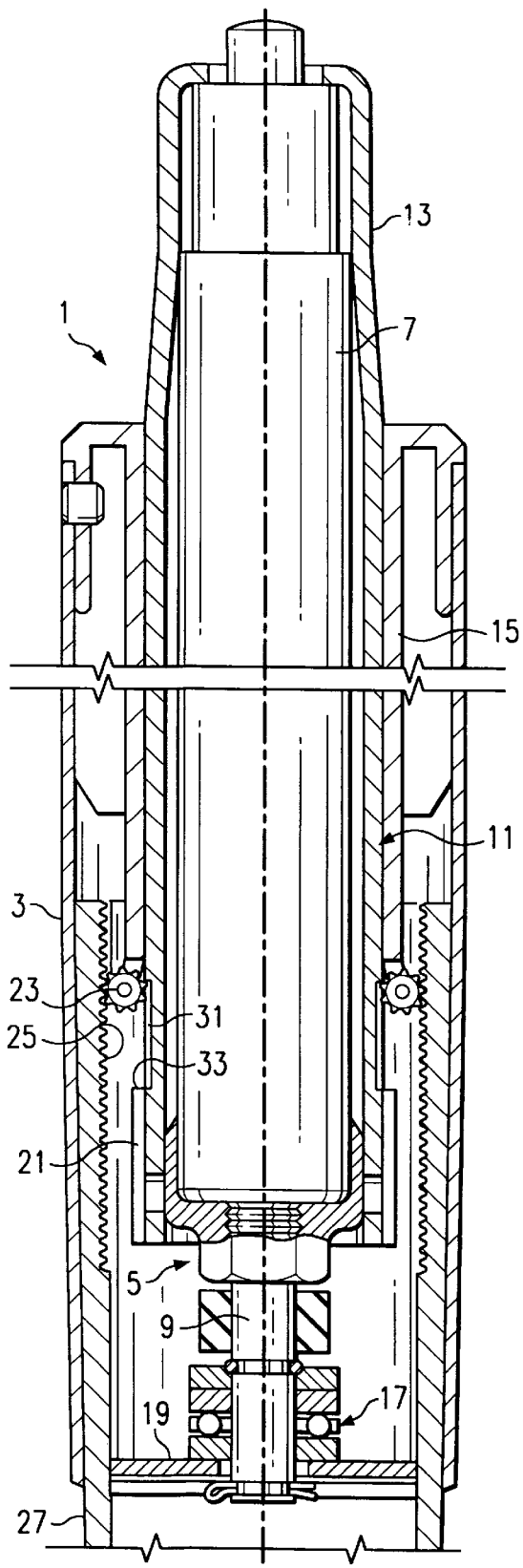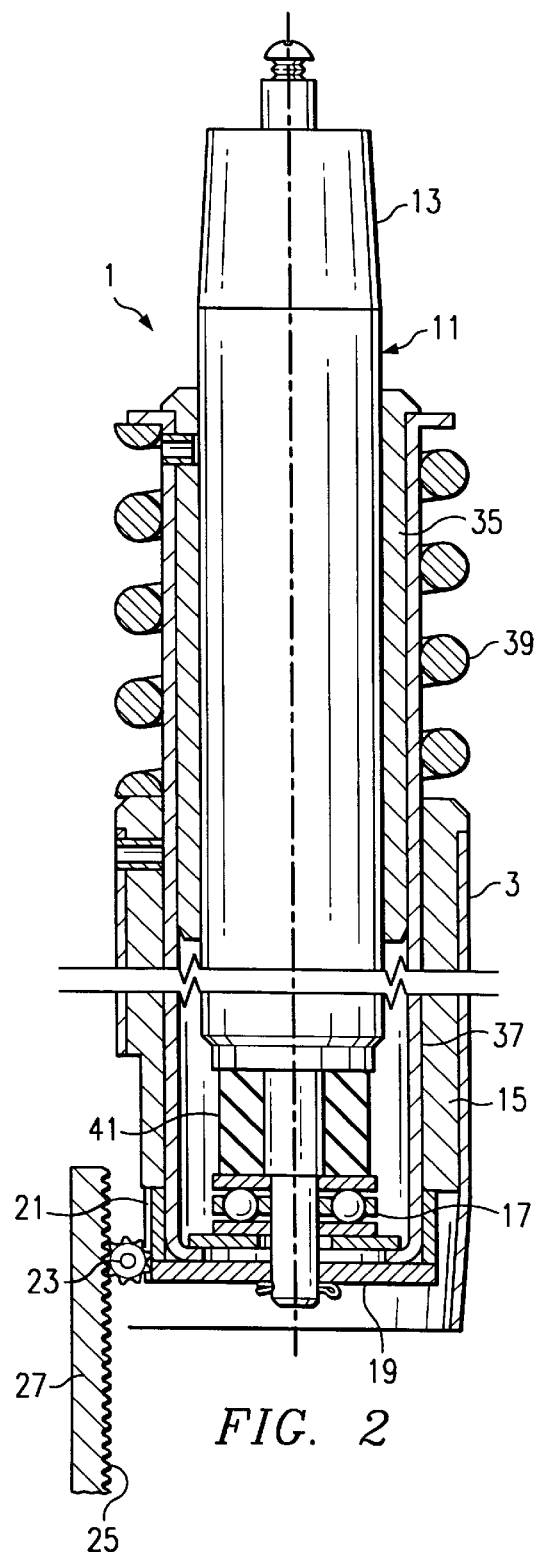
FIG. 1
FIG. 2

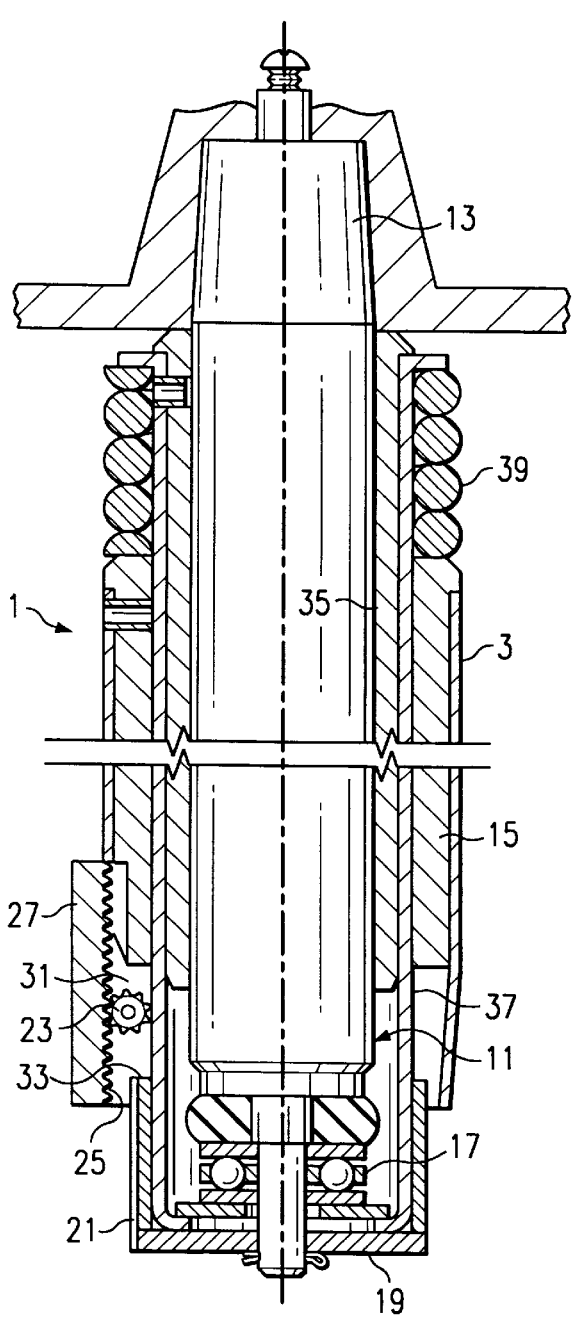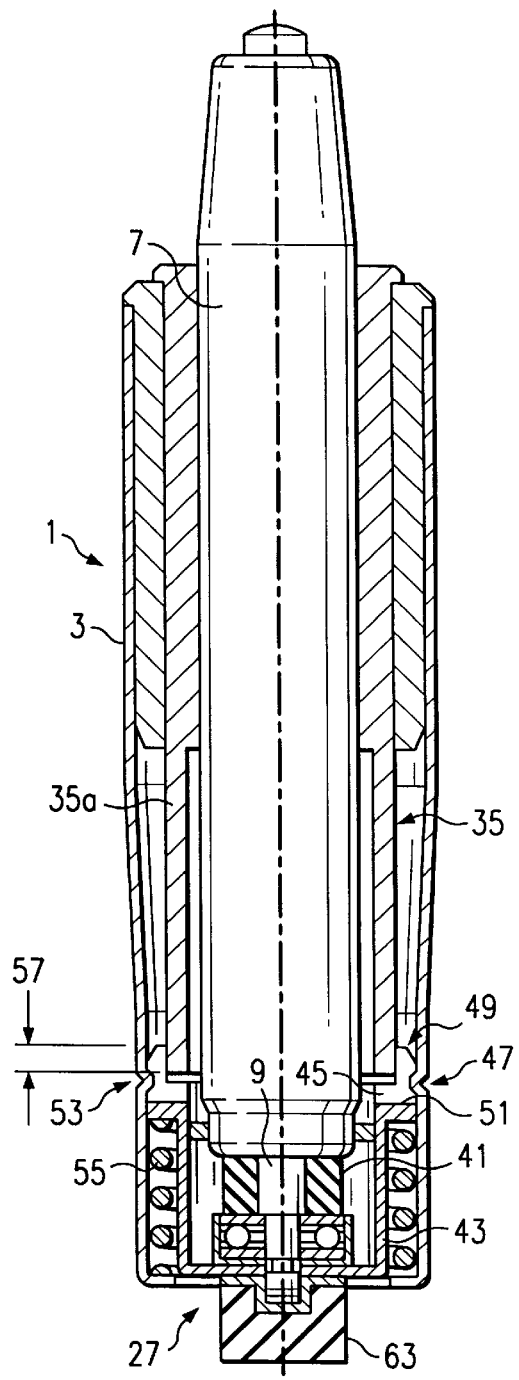
FIG. 3
FIG. 4

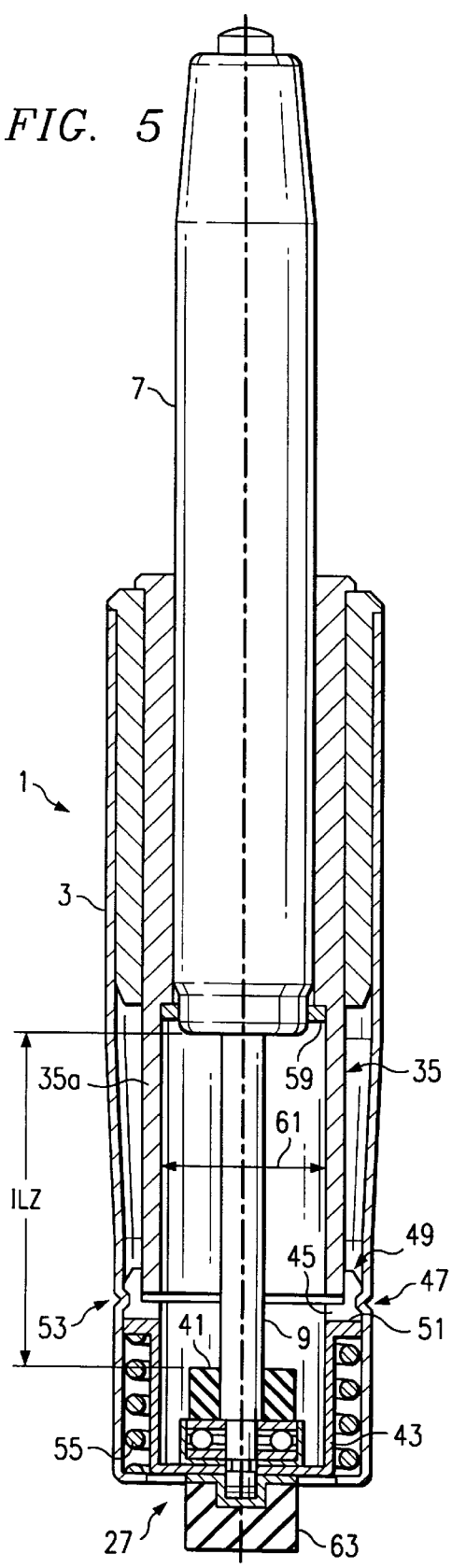
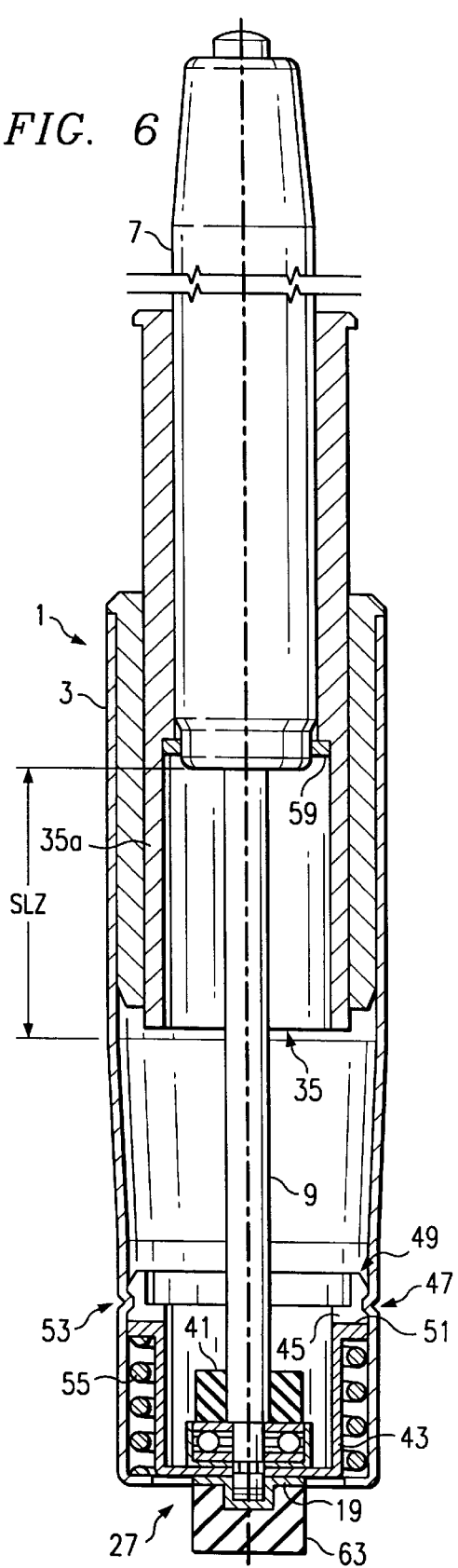
FIG. 5
FIG. 6

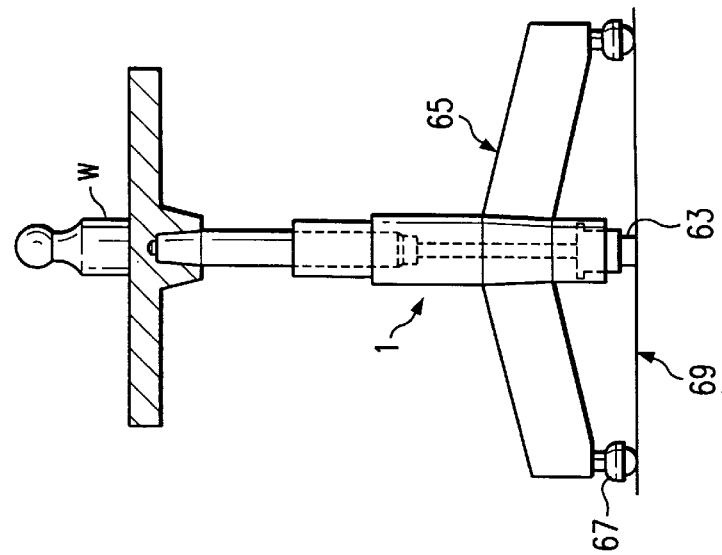
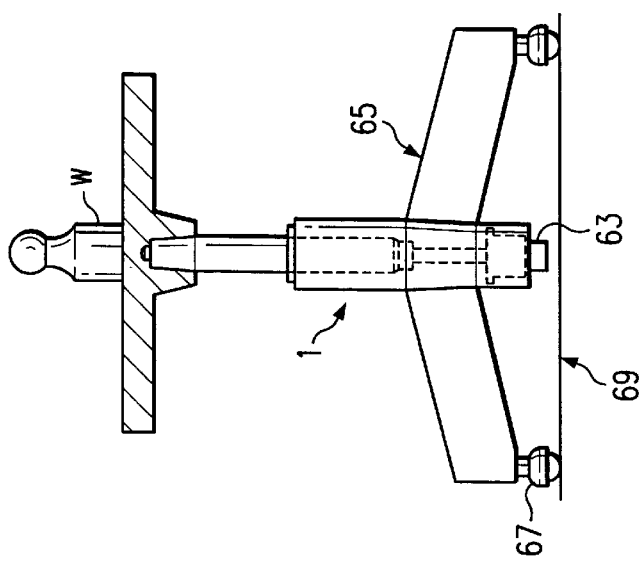
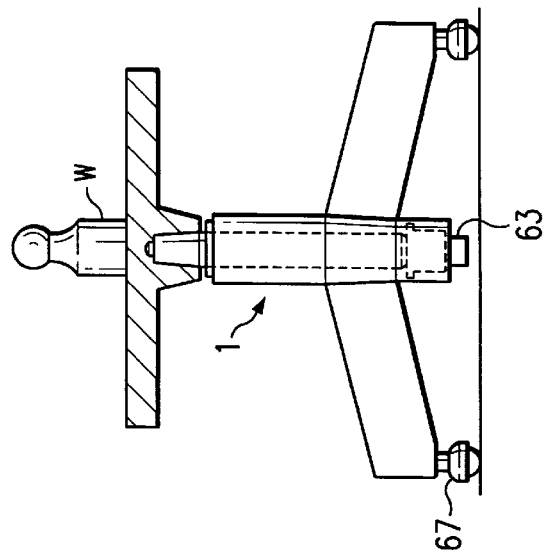

HEIGHT-ADJUSTABLE COLUMN WITH A TRANSMITTING MECHANISM

The present invention relates generally to a height-adjustable column and, in particular, to a height-adjustable column having a transmitting mechanism in which a movable member is arranged to be changed in position as a function of a lift position of a height-changing mechanism.

BACKGROUND OF THE INVENTION

German Patent No. 3,420,528 A1 discloses a height-adjustable column in which a height-changing mechanism, in this case a pneumatic spring, is received within a stationary tube. Such a height-adjustable column is widely employed in the furniture industry, especially in connection with chairs, and has been quite successful.

German Patent No. 4,034,633 A1 and German Patent No. 4,212,282 A1 disclose enhancements of height-adjustable columns in which a telescoping guide tube is provided between the stationary tube and the height-changing mechanism for the purpose of increasing the guide length of the pneumatic spring. The guide tube is pushed out to an extent that depends on the height setting of the column and the pneumatic spring.

SUMMARY OF THE INVENTION

An object of the invention is to provide a height-adjustable column, in which a useful function is provided by a member of a transmitting mechanism that moves in a direction opposite to the extension direction of a height-changing mechanism, such as a pneumatic spring.

In accordance with the invention, this object is achieved by a height-adjustable column that includes a transmitting mechanism that varies its effective transmitted length as a function of the lift position of the height-changing mechanism, by means of a mechanism for reversing the direction of movement to one opposite the direction of extension of the height-changing mechanism. The transmitting mechanism with its varying transmitted length can be used to make adjusting movements for various accessories, such as a brake for stopping a caster base of a chair or ladder from rolling along a floor.

To that end, the mechanism for reversing movement direction has a switch point that governs the actuation of the transmitting mechanism. The switch point is preferably designed to be dependent on the lift position of the height-adjustable column.

In an advantageous embodiment, the switch point of the mechanism for reversing movement direction is governed by a switch device that in turn is triggered at least indirectly by the height-changing mechanism.

In one variant of an embodiment, it is provided for the height-changing mechanism to have an initial lift zone and at least one other lift zone. The transmitting mechanism within the at least one lift zone is actuated independently of the lift position of the height-changing mechanism within this lift zone. The advantage of this arrangement is that the action performed by the transmitting mechanism within the aforementioned at least one other lift zone is available immediately at the switch point and to its full extent.

In accordance with one embodiment, the height-adjustable column has a telescoping guide tube that is moved axially out of the stationary tube in a way that depends on the height-changing mechanism, and that by its lift position determines at least one lift zone.

Furthermore, it is expedient to have the height-changing mechanism rest on a bottom piece of the column that is axially moveable and coacts with the transmitting mechanism. The movement of the bottom piece serves as a drive for the transmitting mechanism.

In order to obtain a clear division between the lift zones of the height-changing mechanism for the switch point, a telescoping guide tube has an interlock mechanism that acts on a switch device in a manner that is dependent on the lift position of the height-changing mechanism. This interlock mechanism of the guide tube consists of an extension piece that engages a cage of a control element.

In an exemplary embodiment, the switch device has a switch spring that biases the switch in the direction of an initial latched position. In particular, the switch device has a base piece that is stationary with respect to the column in the form of a detent point, such as a rib formed on the stationary tube, which forms a detent interconnection with a mating detent point of a control element. The stationary detent point in the form of a rib is obtained quite easily by means of shaping the profile of the stationary tube.

In an advantageous arrangement, the control element includes a cup-like cage having radially movable, resilient switch fingers that have the matching detent profile section. The cage is a simple self-contained component that can be easily installed. Moreover, the cage of the control element is mounted in tandem with the bottom piece of the stationary tube on one member of the height-changing mechanism (e.g., the rod of a pneumatic spring) and therefore also executes all the movements of the bottom piece.

In one embodiment, a mechanism for reversing movement direction consists of a drive mechanism whose driving end is connected operatively to the height-changing mechanism. One possible arrangement is to have the drive mechanism designed as a rack-and-pinion gearing.

In one application of the invention, the stationary tube is mounted on a base having casters, which permits the height-adjustable column to roll transversely along a surface. The control element coacts with a brake, so that in a predetermined lift zone, the brake comes into contact with the surface because of the switch position and prevents any such movement on the surface. Specifically, the invention is useful for a chair that can also be used as a height-raising aid, but in that case, it must not under any circumstances be able to slip or roll away. Two previously totally separate pieces of furniture, a chair and a small ladder or height-raising aid, can be combined into a single piece of furniture by means of the transmitting mechanism.

BRIEF DESCRIPTION OF THE DRAWINGS

For a more complete understanding of the present invention, and the advantages thereof, reference may be made to the following written description of an exemplary embodiment, taken in conjunction with the accompanying drawings, in which:

FIG. 1 is a side cross-sectional view of a first embodiment;

FIG. 2 is a side cross-sectional view of a second embodiment, showing it in a retracted condition;

FIG. 3 is a side cross-sectional view of the second embodiment, showing it in an extended condition;

FIGS. 4 to 6 are side cross-sectional views of a third embodiment,

FIG. 4 showing it fully retracted,

FIG. 5 showing it partially extended, and

FIG. 6 showing it fully extended; and

FIGS. 7 to 9 are side cross-sectional views, which show the third embodiment as installed on a caster base and supporting a load, FIG. 7 showing the adjustable-height column fully retracted, FIG. 8 showing the adjustable-height column partially extended, and FIG. 9 showing the adjustable-height column fully extended.

DESCRIPTION OF THE EMBODIMENTS

FIG. 1 shows a height-adjustable column 1, which has a stationary tube 3 that receives a height-changing mechanism 5 having two members that are movable axially relative to each other. A suitable mechanism 5 is a pneumatic spring having a cylinder 7 and a piston rod 9, such as a pneumatic spring of the type described and shown in U.S. Pat. No. 4,692,057 (Lauderbach, Sep. 8, 1987), which is incorporated into the present specification by reference for all purposes. Furthermore, the column 1 has a supporting tube 11 into which the pneumatic spring 5 is inserted. At its upper end, the supporting tube 11 has a connecting cone portion 13, which accommodates a seat support, for example. Positioned between the supporting tube 11 and the stationary tube 3 is a guide bushing 15, whose inside surface constitutes a slideway for the supporting tube 11. The supporting tube 11 is not absolutely necessary. It serves the purpose of diverting away from the cylinder 7 of the pneumatic spring 5 the load that acts upon the connecting cone 13, so that the pneumatic spring is not exposed to any lateral forces. In principle, the cylinder 7 of the pneumatic spring 5 can also slide directly within the guide bushing 15.

Mounted at the end of the piston rod 9 is a pivot bearing 17, which supports the pneumatic spring on a bottom piece 19 of the stationary tube 3 and carries the working loads.

The supporting tube 11 has rack sections 21, which are preferably provided diametrically opposite each other. Pinions 23 rotatably mounted on the bushing 15 mesh with the rack sections 21, but may optionally do so only during a portion of the movement of the supporting tube 11, as described below. Each pinion 23 also meshes with a rack section 25 on a movable member that constitutes a transmitting mechanism 27. Each pinion 23 and the associated rack sections 21 and 25 constitute a drive mechanism, which is one possible form of a mechanism for moving a member in a direction opposite to the direction of extension of the height-adjustable column. Thus, when the pinions 23 engage the rack sections 21 and the supporting tube 11 moves up, the rotations of pinions 23 are transmitted to the rack sections 25. As parts of the transmitting mechanism 27, the rack sections 25 cause the transmitting mechanism 27 to move axially in the direction of the bottom piece 19, or even beyond the bottom piece 19, the bottom piece having cutouts in it through which the transmitting mechanism 27 can pass. As described below, one use of the transmitting mechanism 27 is to engage a brake with a floor and stop rolling movement of a caster base on which the height-adjustable column is mounted.

It may be desired that the transmitting mechanism 27 should not itself execute the entire lift of the height-changing mechanism or of the supporting tube 11. To that end, the rack section 21 has an open track portion 31. The starting point of this open track portion 31, when the rack section acts on the pinion roller 23, constitutes a switch point 33, from which point on the transmitting mechanism 27 is moved outward (downward). In this way, two lift zones of the height-changing mechanism are obtained, an initial lift zone up to the switch point 33 in which the transmitting mechanism 27 is not functioning, and a second lift zone where the transmitting mechanism 27 can execute an outward movement imposed by the rack and pinion drive mechanism (21, 23, 25).

FIGS. 2 and 3 show a height-adjustable column 1 that has a pneumatic spring as a height-changing mechanism. The column has a telescoping guide tube 35 that extends relative to the stationary tube 3 for the purpose of increasing the guide length. The guide tube 35 is enveloped by an extension tube 37, which in turn is connected to the bottom piece 19 of the stationary tube 3. The extension tube has an encircling lip at its upper end against which rests a compression spring 39. The other end of the compression spring engages the upper end face of the guide bushing 15. Consequently, the bottom piece 19 is likewise axially movable. For that purpose, the stationary tube 3 is open in the region of the pivot bearing 17, so that the bottom piece 19 can move downwardly out of the stationary tube.

The bottom piece 19 has a mechanism for driving a transmitting mechanism 27 in a direction opposite the extension direction of the column 1, which is essentially the same as the one already described above and shown in FIG. 1, except that the switch point 33 is defined differently. The rack section 21 is simply made shorter than the maximum travel distance of the bottom piece 19. Consequently, this results in an open track 31, as shown in FIG. 3. As can be seen from FIG. 2, when the pneumatic spring extends, a gap opens up between the support at the connecting cone 13 and the telescoping guide tube 35 that enables the guide tube to move out of the guide bushing 15 by way of a utilization of the spring force of the compression spring 39. In this outward movement of the guide tube, the bottom piece is likewise moved, with its inward movement into the stationary tube 3 being converted into an outward movement of the transmitting mechanism 27. FIG. 3 shows the maximum downward movement of the bottom piece 19 and the maximum upward movement of the transmitting mechanism 27. Like the first embodiment, the transmission mechanism 27 can be used with a brake or can move some other accessory associated with the column in a direction opposite to the direction of extension of the column and in a selected relationship to the lift position of the column.

FIGS. 4–6 show a height-adjustable column 1 with a modified mechanism for moving a member in a direction opposite from the direction of extension of the height-adjusting mechanism. The mechanical construction of the height-adjustable column is the same in all three figures—the respective figures show different extended positions. In FIG. 4, the height-adjustable column is shown fully retracted. Cylinder 7 of the height-changing mechanism rests on a stop buffer 41.

Mounted in tandem and in contact with an axially movable bottom piece 19 is a cage 43 that constitutes a control element 45 of a switch device 47. The control element consists of several switch fingers 49, which are radially resilient and which have matching detent profile sections 51. The detent profile sections releasably engage a stationary base detent point 53, which is a rib formed in the stationary tube 3. A switch spring 55 biases the cage 43 in a direction away from the bottom piece 19 toward the stationary detent point 53.

Between the cylinder 7 of the height-changing mechanism and the radially movable switch fingers 49, there is an intermediate space which receives a lower extension portion 35a of a telescoping guide tube 35 when the position of the height-changing mechanism is within an initial lift zone ILZ (see FIGS. 4 and 5). That arrangement constitutes an interlock mechanism 57 for the switch device 47, since the intermediate space needed for the radially inward movement of the switch fingers 49 is then blocked by the portion 35a.

In FIG. 5, the cylinder 7 of the height-changing mechanism is at the end position of the initial lift zone ILZ. At that point, a driving ring 59 on the cylinder 7 has covered a no-load path within a larger diameter portion 61 of the guide tube. The switch 47 is still closed in this position also. Even in FIG. 6, where the height-adjustable column 1 has reached the maximum extended position at the end of a second lift zone SLZ, the switch is still closed, although the above-described intermediate space now exists between the switch fingers 49 and the height-changing mechanism.

Upon further extension of the height-changing mechanism along the second lift zone SLZ, the driving ring 59 on the cylinder 7 enables the cylinder 7 to extend the guide tube 35, thereby enhancing the support of the cylinder 7 in the second lift zone SLZ. When there is a downward load on the cylinder 7 greater than the spring force of the switch spring 55 and the holding force of the detent connection between the switch fingers 49 and the detent point (the rib) 53, the switch 47 disengages, and it becomes possible for the transmitting mechanism 27 to be moved axially downwardly out of the stationary tube 3. The transmitting mechanism 27 is connected to the bottom piece 19 and to an extension piece of the piston rod. The transmitting mechanism also has a braking mechanism in the form of a frictional element 63, the function of which is described below and depicted in FIGS. 7 to 9.

FIGS. 7 to 9 show one application of the invention. Here, the height-adjustable column 1 is part of a chair that has a base 65 and casters 67 so that it can roll along a surface 69, usually a floor. In FIG. 7, the height-adjustable column is in the fully retracted position of FIG. 4. The seat supports and a symbolically depicted weight W illustrate that the column is subjected to a load.

FIG. 8 corresponds to FIG. 5 with respect to the position of the height-adjustable column. The initial lift zone ILZ corresponds to the usual lift zone (range of height adjustment) of a chair. In FIG. 9, corresponding to FIG. 7 for column 1, beyond the initial lift zone, the switch 47 is over-powered by the load. Because of the load on the seat support, the transmitting mechanism 27 is able to extend downwards out of the chair column and come into contact with the surface 69. Thereupon, the frictional element 63 is pressed against the surface 69 and exerts a frictional force on the chair column that opposes any transverse movement, which keeps the chair column stationary. This special function is provided for cases where the chair is to be used as a height-raising aid, and thus it must not under any circumstances roll away.

What is claimed is:

1. A height-adjustable column, comprising a stationary tube;

a height-changing mechanism received in the stationary tube and having a first member and a second member that are axially movable with respect to one another; and a transmitting mechanism having a movable member that is adapted to be moved as a function of a lift position of the height-adjusting mechanism, the movable member of the transmitting mechanism being movable in a direction opposite to the extension direction of the height-adjusting mechanism when the height-changing mechanism is in a predetermined lift zone of the height-changing mechanism.

2. A height-adjustable column in accordance with claim 1, wherein the transmitting mechanism is inoperable in an initial lift zone of the height-changing mechanism up to a switch point that governs the actuation of the transmitting mechanism.

3. A height-adjustable column in accordance with claim 2, wherein the switch point of the transmitting mechanism is governed by a switch device that is responsive at least indirectly to the length of the height-changing mechanism.

4. A height-adjustable column in accordance with claim 1, wherein the height-changing mechanism has an initial lift zone and at least one other lift zone, and the transmitting mechanism is inoperable in said initial lift zone and is operable independently of the lift position of the height-changing mechanism in said at least one other lift zone.

5. A height-adjustable column in accordance with claim 1, and further comprising a telescoping guide tube that is movable axially out of the stationary tube when the length of the height-changing mechanism is within the predetermined lift zone.

6. A height-adjustable column in accordance with claim 1, wherein one member of the height-changing mechanism is supported on a bottom piece of the height-adjustable column, said bottom piece being axially movable relative to the stationary member and being operatively associated with the transmitting mechanism.

7. A height-adjustable column in accordance with claim 5, wherein the telescoping guide tube has an interlock mechanism that coacts with a switch device in response to the height-changing mechanism being in said predetermined lift zone.

8. A height-adjustable column in accordance with claim 7, wherein the switch device includes a switch member having a releasable latched position in which it is coupled to the stationary tube and a switch spring that biases the switch member to the latched position.

9. A height-adjustable column in accordance with claim 8, wherein the switch device is retained in the latched position by a detent.

10. A height-adjustable column in accordance with claim 9, wherein the detent includes a rib formed on the stationary tube.

11. A height-adjustable column in accordance with claim 9, wherein the switch member is a cup-like cage having radially movable switch fingers, each of which has a detent profile portion.

12. A height-adjustable column in accordance with claim 11, wherein the spring biases the cage of the switch device to the latched position relative to a bottom piece of the stationary tube.

13. A height-adjustable column in accordance with claim 11, wherein the interlock mechanism of the guide tube comprises an extension portion that engages the movable switch fingers and holds them in the latched condition.

14. A height-adjustable column in accordance with claim 1, wherein the movable member of the transmitting mechanism has a driven end, and a reversing drive mechanism operatively connects said driven end of the drive member to one of said first and second members of the height-adjusting mechanism.

15. A height-adjustable column in accordance with claim 14, wherein the reversing drive mechanism is a rack-and-pinion gear.

16. A height-adjustable column in accordance with claim 1, wherein the stationary tube is mounted on a base having casters that enable the height-adjustable column to be rolled along a surface, and the movable member of transmitting mechanism includes a brake, whereby when the height-changing mechanism is in a predetermined lift zone, said movable member of the transmitting mechanism is moved to engage the brake in frictional contact with the surface so as to prevent rolling of the base along the surface.

* * * * *

UNITED STATES PATENT AND TRADEMARK OFFICE
CERTIFICATE OF CORRECTION

PATENT NO. : 5,992,815

DATED : November 30, 1999

INVENTOR(S) : Manfred Metzdorf and Axel Knopp

It is certified that error appears in the above-identified patent and that said Letters Patent is hereby corrected as shown below:

Col. 6, line 17, "height-adjusting" should read --height-changing--; and
Col. 6, line 22, "height-adjusting" should read --height-changing--.

Signed and Sealed this

Tenth Day of April, 2001

*Attest:*

NICHOLAS P. GODICI

*Attesting Officer*  *Acting Director of the United States Patent and Trademark Office*